(12) United States Patent
Abdollahi (10) Patent No.: US 7,315,383 B1
(45) Date of Patent: Jan. 1, 2008

(54) SCANNING 3D MEASUREMENT TECHNIQUE USING STRUCTURED LIGHTING AND HIGH-SPEED CMOS IMAGER

(76) Inventor: Mohsen Abdollahi, 9008 Cannstatt Dr., Huntsville, AL (US) 35802

(*) Notice: Subject to any disclaimer, the term of this patent is extended or adjusted under 35 U.S.C. 154(b) by 459 days.

(21) Appl. No.: 10/887,568

(22) Filed: Jul. 9, 2004

(51) Int. Cl.
*G01B 11/24* (2006.01)
(52) U.S. Cl. .................................. 356/601
(58) Field of Classification Search ......... 356/601–613
See application file for complete search history.

(56) References Cited

U.S. PATENT DOCUMENTS

| | | | | |
|---|---|---|---|---|
| 5,237,404 A | * | 8/1993 | Tanaka et al. | 348/128 |
| 5,652,658 A | * | 7/1997 | Jackson et al. | 356/398 |
| 6,392,754 B1 | * | 5/2002 | Pingel et al. | 356/603 |
| 6,639,685 B1 | * | 10/2003 | Gu et al. | 356/603 |
| 6,980,302 B2 | * | 12/2005 | Knighton et al. | 356/607 |
| 2001/0021026 A1 | * | 9/2001 | Liu | 356/601 |
| 2004/0046966 A1 | * | 3/2004 | Fujita | 356/604 |
| 2004/0156043 A1 | * | 8/2004 | Toker et al. | 356/237.1 |
| 2004/0201856 A1 | * | 10/2004 | Quadling et al. | 356/601 |

* cited by examiner

*Primary Examiner*—Tarifur Chowdhury
*Assistant Examiner*—Isiaka O Akanbi
(74) *Attorney, Agent, or Firm*—Mark Clodfelter (57) ABSTRACT

A method for 3 dimensional scanning using a light source for projecting a source of illumination configured to be non-uniform or having a predetermined pattern is disclosed. A CMOS sensor having randomly accessible rows of pixels, and an associated lens system, is mounted above a workpiece, with the workpiece and sensor movable with respect to each other in a scanning relation. Rows of pixels of the sensor are selected for registering reflected light, with data from the selected rows provided to a computer for calculating height information of features of the workpiece. Significantly, both 2 dimensional and 3 dimensional images may be generated during a single scanning pass because of the non-uniform source of light and random access capabilities of the sensor.

17 Claims, 10 Drawing Sheets

SCANNING 3D MEASUREMENT TECHNIQUE USING STRUCTURED LIGHTING AND HIGH-SPEED CMOS IMAGER

FIELD OF THE INVENTION

This invention relates to optical measurement systems of surface profiles utilizing optical reflections from a surface under examination, and particularly to such a measurement system wherein a multi-section, structured lighting technique is used to obtain depth information.

BACKGROUND OF THE INVENTION

Obtaining an accurate three-dimensional profile of a surface for measurement purposes and checking integrity of objects, or parts produced through a process, has been subject to ongoing research and development. Need for quickly measuring size of objects, particularly in three dimensions, stems from stringent requirements for product quality, process control and process monitoring. These needs are driven by increasingly higher manufacturing rates of mass produced goods and continuing miniaturization of components. For example, with respect to electronics manufacturing, requirements for checking size and position of components is extremely critical. Here, a solder paste material used to bond components to printed circuit boards must have a known volumetric size to ensure that electrical and mechanical characteristics of a solder joint meets quality requirements of the product.

Non-contact, three-dimensional measurement techniques are generally preferred over tactile methods because non-contact techniques can be used to inspect electronic components and other delicate parts without touching, or possibly destroying the components or parts to be measured. Moreover, due to high manufacturing rates, speed of measurement is an important feature. For this reason, non-contact, optical techniques have received more acceptance as they are generally faster than other measuring techniques. Among many different optical methods that have been developed, two approaches have become more commonly used than others. A first class of these techniques generally includes triangulation [1-7], and a second class generally includes fringe-based techniques (through Moiré or phase-shifting profilometry) [8-2]. Triangulation is a relatively effective technique wherein a beam or sheet of light, often a laser source, is projected obliquely onto a surface being examined and a deformed image of a reflected spot or line is generated and captured using a camera, such as a CCD camera. Deformations of the spot or line are analyzed by using a computer to derive height information. Effectiveness of triangulation is limited to those relatively few applications wherein a reflection from surfaces of objects to be measured is of sufficient intensity for a camera to register an image, but not so intense that over-exposure or "blooming" of the image occurs. In practice, finding a reasonable compromise of lighting is often difficult, if not an impossible task. This is particularly true in cases where a source of illumination is a laser. For example, electronic parts and printed circuit board assemblies contain objects of widely different reflectivity, such as copper traces, solder paste, metallic objects, solder mask, screen print, plastic-encased components, and other such objects. As such, finding an imaging illumination that will work for all types of reflectivities associated with these components and substances is difficult, and in some instances impossible. Moreover, resolution of triangulation-based systems is primarily proportional to magnification, which in turn depends to some extent on pixel resolution of the camera. To obtain high accuracy, magnification needs to be as high as possible, which in turn demands high pixel resolution. Pixel resolution in turn determines throughput or sampling rate.

Fringe-based methods derive depth information through manipulation of image intensities obtained from a phase-shifted source of illumination. These methods offer certain advantages over triangulation, such as higher resolution and ability to perform full-field three-dimensional imaging. A main disadvantage of these methods is complexity involved in processing interfrograms or phase-shifted images, such as unwrapping of phase images. Moreover, similar to triangulation, these techniques also require that imaging conditions, particularly illumination intensity, be carefully controlled to avoid underexposure and overexposure of components to be measured. As mentioned above, in complex scenes containing objects of widely differing reflectivity, this is usually impractical.

In contrast to the above-mentioned methods, three-dimensional measurement techniques that use only a reflection of structured lighting have been left generally unexplored, perhaps because of a lack of understanding that intensity variations due to surface reflectivity changes need to be decoupled from intensity variations caused as a result of changes in a surface profile.

One method of relating surface height variations to intensity modulations has been presented in [13] wherein two sources of structured light are used to measure height of components and objects. The two sources of light are arranged such that objects of different heights illuminated by structured light will reflect different levels of light. As a result, intensity of reflected structured light is proportional to height of a surface that reflects the light. However, this method has three main drawbacks, a first of which requiring that the two light sources be identical in output, in turn requiring calibration of the light sources. Second, obtaining a surface profile of objects requires two passes. With each pass, one of the light sources is used to capture an image of the surface. Since the scanning process is a mechanical operation, speed of scanning will certainly be a limiting factor for many applications. Third, the technique suffers from the common problem of underexposed or overexposed images of components due to different surface reflectivity of these components. Of course, it is possible to take numerous passes over a surface, each pass being at a different illumination setting, but this would be impractical for high-speed applications.

DETAILED DESCRIPTION OF THE DRAWINGS

The present invention is based on using reflected intensity of a varying intensity pattern projected obliquely onto a surface being profiled. This technique involves scanning a surface under examination in order to develop a three-dimensional map of the surface. Unlike the approach presented in [13], Applicant's method uses a single source of illumination and requires only one pass over a surface under examination, and thus is faster than methods of the prior art. Furthermore, the invention addresses a number of commonly encountered problems, such as underexposed and overexposed images, that have not been solved by methods of the prior art.

As will be described, Applicant's invention offers the following novel and unique features:

High dynamic range: The proposed method can deal with complex scenes containing objects of varying reflectivity without any compromise on measurement resolution.

Combined 2D imaging: The proposed method can be used to construct an imaging device that can produce 2D images of a surface being examined simultaneously with a scanning operation taking place to obtain 3D image data. Furthermore, Applicant's method facilitates static 2D image capture without scanning, in a similar manner as static video capture may be accomplished by a conventional CCTV camera. This is an important feature of the invention as most industrial applications involve a combination of 2D and 3D image data to perform required analysis.

Robust and precise operation: Computation of height and depth values of imaged components is extremely simple and involves only basic mathematical operations to manipulate pixel intensity values. Since Applicant's approach is based principally on light intensity, spatial resolution does not affect elevation measurement accuracy.

Multiple resolution and measuring range: A projected structured light pattern can be designed such that the light pattern offers several measuring ranges simultaneously during one scanning operation. This may be combined with other features mentioned above to develop a unique measurement system that may be used for a variety of different applications.

Figure 1A:
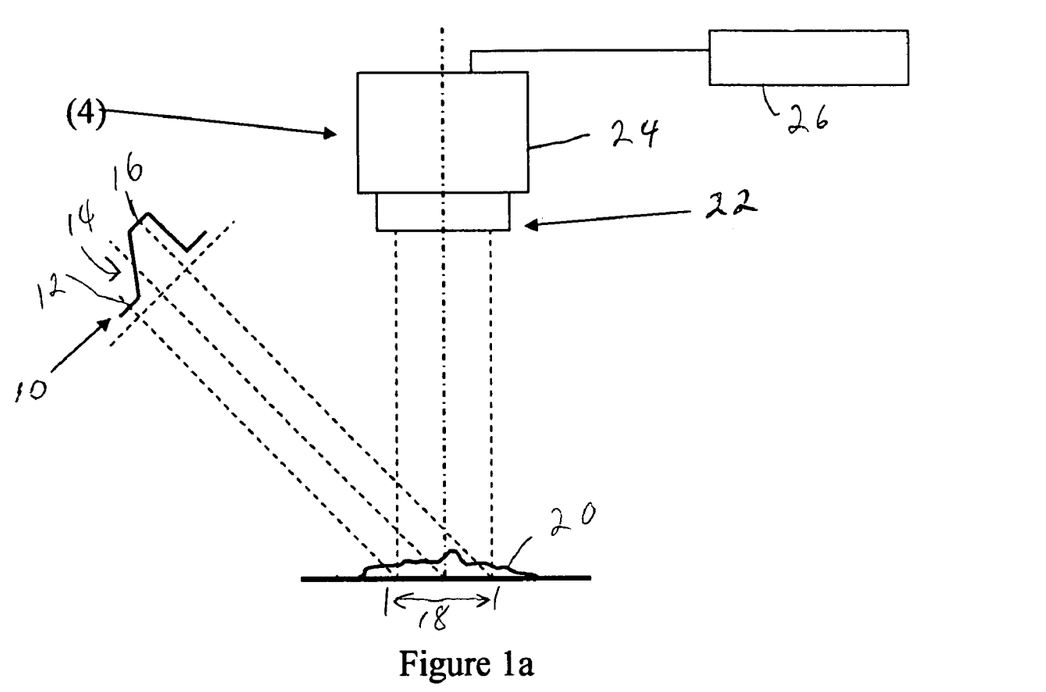
FIG. 1a is a diagrammatic illustration of a system for implementing my new measuring technique.
Figure 1B:
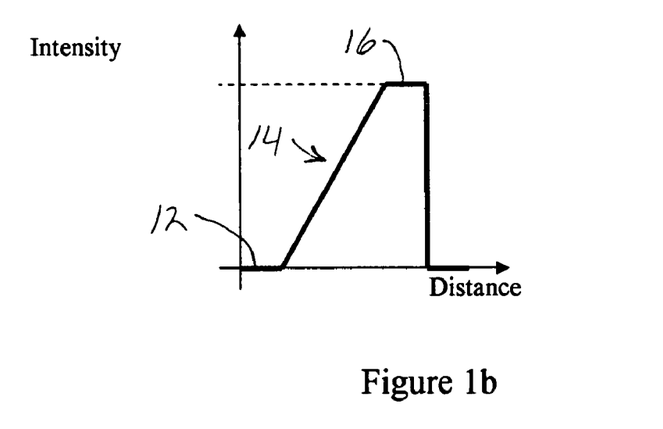
FIG. 1b is a profile of light intensity projected by a light source of my new measuring system.

Referring initially to FIG. 1a, an intensity pattern or gradient 10 is developed that has levels of light intensity ranging from a lower intensity level that may simply be dark or unilluminated to establish a zero light reference at 12 and rises upward in intensity at 14 to a highest level of intensity at 16 that is just below a saturation level of pixels registering a bright reflection from a scene being examined. When projected obliquely as shown, the gradient region 14 may be anywhere from a few microns in width to measure height to a high degree of accuracy, or where such accuracy is not needed then the gradient may be much larger. Such a gradient or pattern may be generated in many different ways, such as coating a transparent sheet material with a graduated coating of opaque material, or by generating a linear light gradient by a computer program and photographing the gradient on a computer monitor. The resulting film negative may then be used to develop gradient 14. In such an arrangement, the film is placed in front of a light source, with a projection lens adjacent the film to develop a collimated beam of light containing the gradient. Thus, this intensity pattern, as shown in FIG. 1b, is projected over an area 18 of a workpiece 20, the area 18 being imaged through an imaging lens 22 of a CCD camera 24. An output of camera 24 is provided to computer 26 for analysis.

FIGS. 2, 3, 4 and 5 illustrate a principle of operation of illumination of the present invention. Here, a point, point A, on workpiece 20 is considered as the workpiece is moved under lens 22 during a scanning operation. Later, it will be shown how this concept is expanded to obtain surface heights and depths of all points of the workpiece during a scanning operation.

Figure 2:
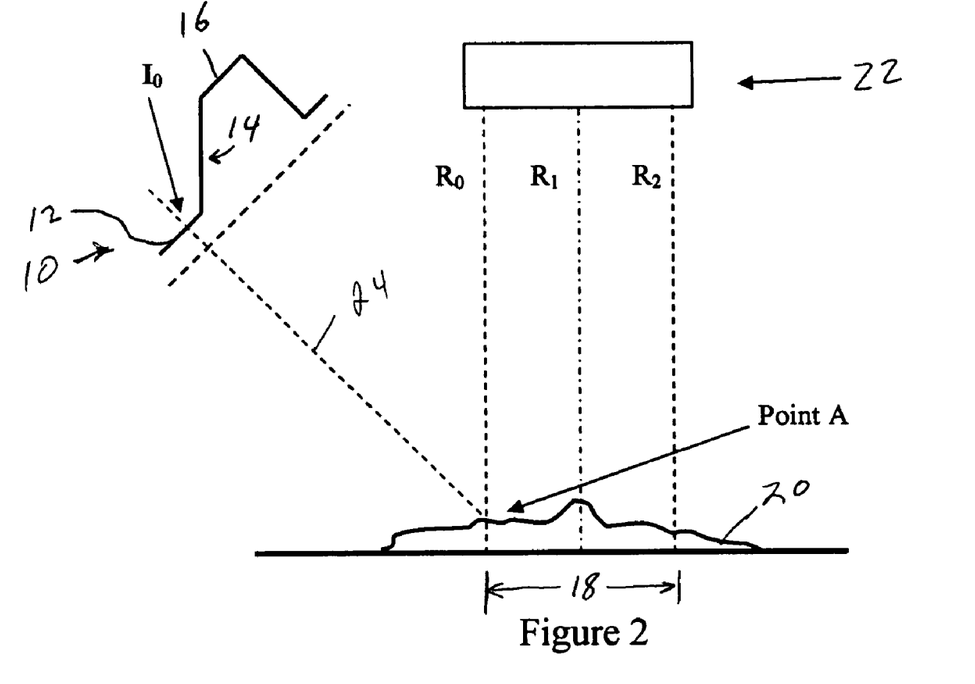
FIGS. 2, 3 and 4 are diagrammatic illustrations showing operation of my new measuring system.
Figure 3:
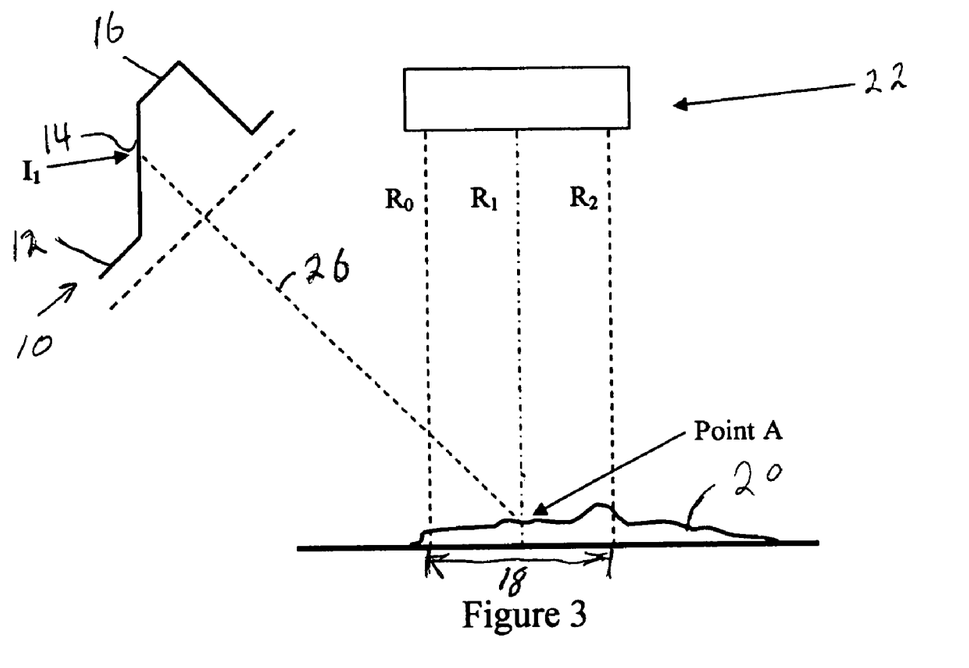
Figure 4:
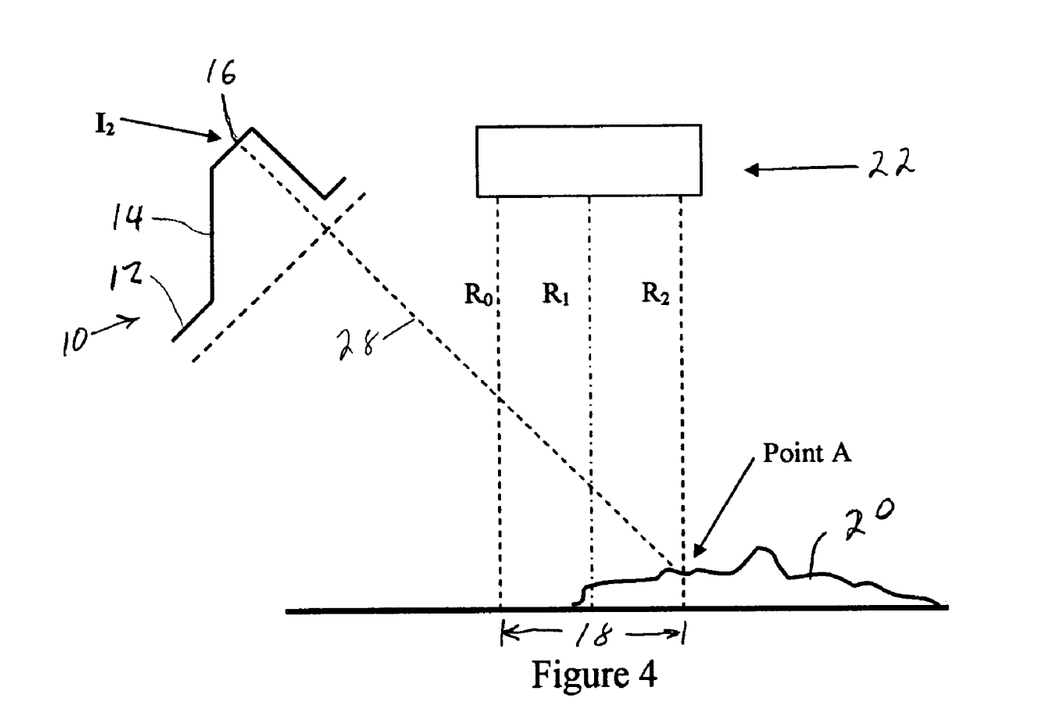
Figure 5:
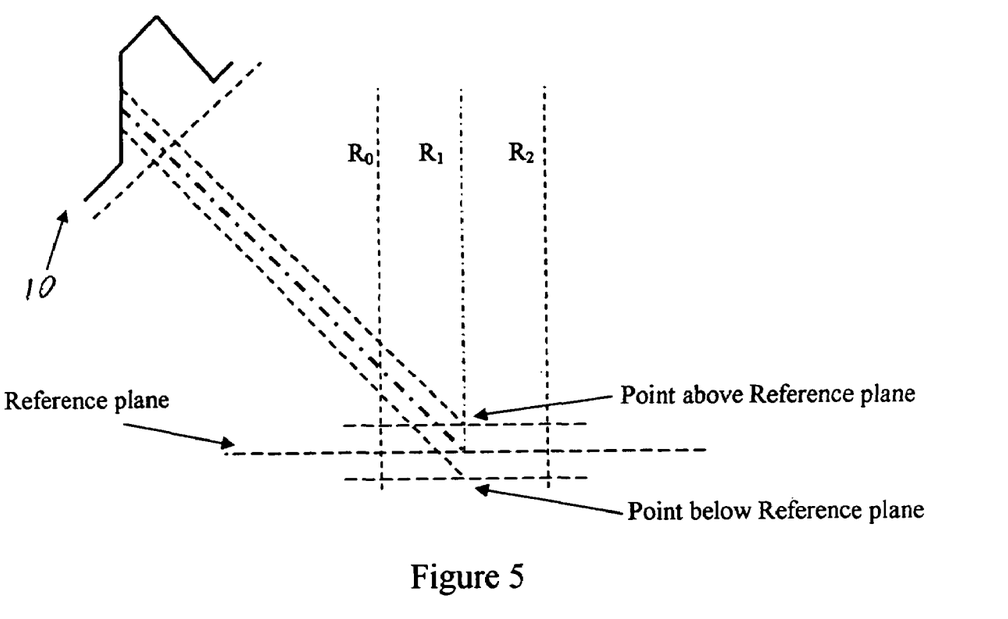
FIG. 5 is a diagrammatic illustration showing a measurement technique for measuring height of an object under surveillance.

In FIG. 2, point A is illuminated by light rays 24 of intensity pattern 10 having a relatively low or dark intensity value $I_0$. This point is initially imaged by the imaging system when point A is at position $R_0$. The reflection intensity value of point A produced by the imaging system is recorded by computer 26 as a value $M_0$. As workpiece 20 is moved during the scanning operation, point A will arrive at position $R_1$ where it is illuminated by brighter light rays 26 of light gradient 14 (FIG. 3) and again imaged by the imaging system. Significantly, a level of light reflected from point A as defined by light gradient 14 is proportional to height of point A. At this time, point A is illuminated at an illumination level ($I_1$) dependent on a point of light gradient 14, illustrated by rays 26, and its higher intensity value is recorded as $M_1$. As the scanning operation continues and the workpiece moves to point $R_2$, where the imaging system measures reflected intensity of light rays 28 (FIG. 3) illuminating point A for a third time and the measured intensity, referred to as $M_2$, is recorded. It should be noted that this time, when point A is at position $R_2$ within area 18, point A is illuminated a brightest intensity 16 that is reflected by point A at intensity value $I_2$. Using intensity values $M_0$ and $M_2$, an intensity value may be calculated that correlates with average reflectivity of point A. This may be done simply by taking an average of the two readings, as shown in Equation [1] below:

$$r=(M0+M2)/2 \qquad [1]$$

In instances where a light intensity gradient of intensity pattern 10 projected onto workpiece 20 is linear, any difference between r and $M_1$ is due to the height of Point A. If the point is below a known reference plane (FIG. 5), point A will appear darker due to light rays striking point A being developed by a less intense region of light gradient 14, resulting in the value of r being less than M1. Alternately, if the value of r is larger than M1, then point A must be higher than the reference plane due to light rays striking point A being developed by a more intense region of light gradient 14.

Assuming that intensity pattern 10 varies linearly from a lowest value 12 to a highest value 16 and that imaging system 22 has a linear response, then height of any point may be obtained from Equation [2] below:

$$\text{Height}=(M_1-r)*K \qquad [2]$$

Where K is a constant derived from a calibration procedure, such as placing an object of known height in a field of view of imaging system 22 and recording values of $M_0$, $M_1$ and $M_2$.

If linearity of the projected pattern and sampling of the imaging device is not possible, then Applicant's technique is still valid but requires a more elaborate calibration procedure wherein non-linearity of an illumination source is accounted for. One possible approach to compensate for such non-linearity of the illumination source is to use a look-up-table holding a plurality of values for K that define the non-linear values of the illumination source instead of just one value of K representative of linear illumination.

With this approach, the lookup table will hold a plurality of values that can be derived from calibration of the system.

Applicant's technique, as described so far, can be used to measure height of a single point on an object under examination. To build a complete surface profile of an object or surface under examination, the object under examination (or the complete height measurement device) may be moved to many different locations so that a large number of points on the surface of the object are examined. However, this approach is too slow for many applications to be practical. In the following section, Applicant's proposed method is expanded so that a line profile of a surface under examination may be immediately obtained. By taking a number of these line profiles, a complete 3D map of the surface under examination may be developed.

Figure 6:
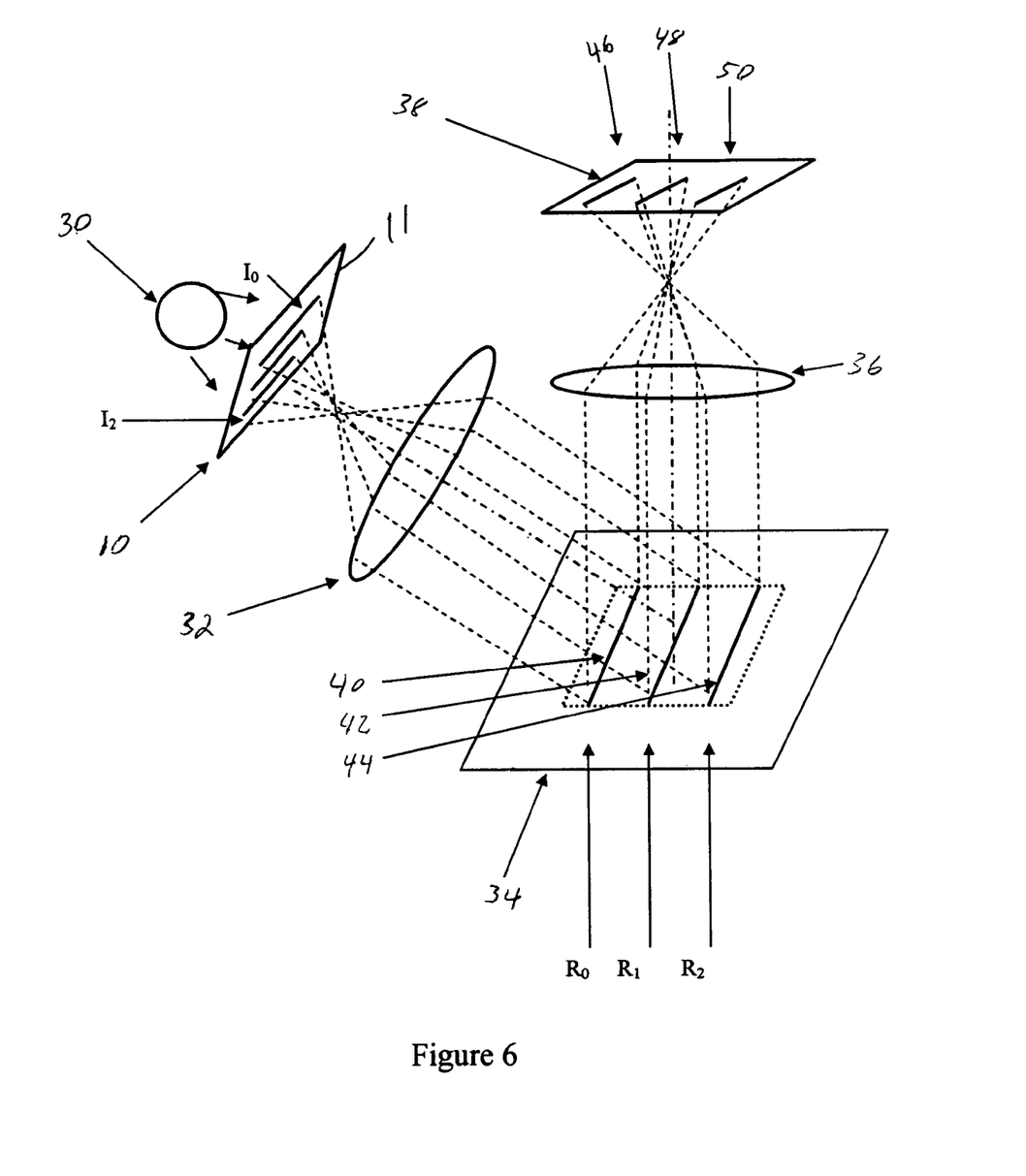
FIG. 6 is a diagrammatic view illustrative of particulars of operation of my new measuring technique.

In order to obtain a line profile of a section, rather than height value for a single point, it is proposed that a two-dimensional imaging sensor be used. Such a sensor and associated system is shown in FIG. 6. Here, light source 30 is used to develop intensity pattern 10 having a gradient as described above, such as a film negative 11 containing the gradient, an image of which being developed telecentrically (or collimated) by projector lens 32 onto surface under examination 34. The projection mechanism may incorporate a Shiempflug principle that dictates an angle of the axis of lens 32 with respect to a plane of film 11 so that the image of the gradient is uniformly focused. Alternately, a non-telecentric intensity pattern and imaging may be used. However, this would require further processing of image data to avoid measurement errors. Imaging lens 36 telecentrically forms an image of surface under examination 34 onto imager 38, which records reflected intensity values of line section 40, line section 42 and line section 44 at position $R_0$, $R_1$ and $R_2$. Images of line section 40, line section 42 and line section 44 formed on imager 38 are image row 46, image row 48 and image row 50, respectively. Where objects to be measured are small in height, then rows 46, 48 and 50 may be closer together, and where objects to be measured are taller, then pixel rows 46, 48 and 50 are further apart. Thus, a range of height measurement is dependent on row spacing.

During the scanning operation, imager 38 is triggered at known position intervals, using some form of position sensing device, to capture an image and output intensity values for all pixels along rows that correspond to locations designated by image row 46, image row 48 and image row 50. Hence, at each interval, intensity values of 3 rows of surface under examination 34 are recorded. These intensity values correspond to $M_0$, $M_1$ and $M_2$ values as described above, but instead of just one value, there are an array of values for each recorded row of pixels along selected rows of image captured. Once intensity values $M_0$, $M_1$ and $M_2$ for the same line section within scene under examination 34 are recorded, Equations [1] and [2] can be used to compute height for each pixel.

If a conventional 2D imager, such as those used in surveillance or general-purpose machine vision cameras, are used, scanning rate would be extremely slow as an image acquisition frame rate of a conventional image sensor is usually around 30 frames per second. By partial scanning, this can be increased but not to an extent that would allow high-speed scanning. An alternative to a two dimensional imager would be to use a tri-linear, line-scan sensor. An example of this approach is documented in [12]. This type of sensor has only three rows of pixels used to capture data. However, this would not allow combined 2D imaging, or static 2D imaging without any scanning. Moreover, a tri-linear sensor has a fixed spacing between three rows of sensing elements. This would imply that locations of line section 40, line section 42 and line section 44 is dictated by magnification of imaging lens 36, meaning that optimization of performance of the system would not be possible. To overcome these problems, a high-speed 2D, CMOS imager such as MT9M413 from Micron Technology™, Inc. located in Pasadena, Calif. may be used. This type of sensor offers two distinct features, a first of which is random access pixel read capability resulting in very short read-out times as readout of pixels may be limited to just a few rows, as opposed to an entire frame. A second advantage is that a data rate of this sensor is about 660 MHz, which is extremely fast. When this feature is combined with the random access capability as described, image acquisition rates as high as 500,000 rows (lines) per second may be obtained.

With Applicant's system, the MT9M413 sensor (or a similar sensor) may be used to obtain intensity values from 3 randomly positioned rows of pixels at a rate of over 9400 rows per second (allowing 100 microsecond for exposure). This high acquisition rate allows a scanning operation to be carried out much faster than methods of the prior art. Furthermore, the selected sensor has on-board A/D converters, and outputs pixel intensities in digital format. This sensor is therefore ideal for pre-processing intensity values to compute height data and only transmit height information to be recorded. This ensures that data bandwidth between the 3D measurement system and other processing units, such as a computer that may be used to further analyze data, may be simplified to minimize cost.

Figure 7:
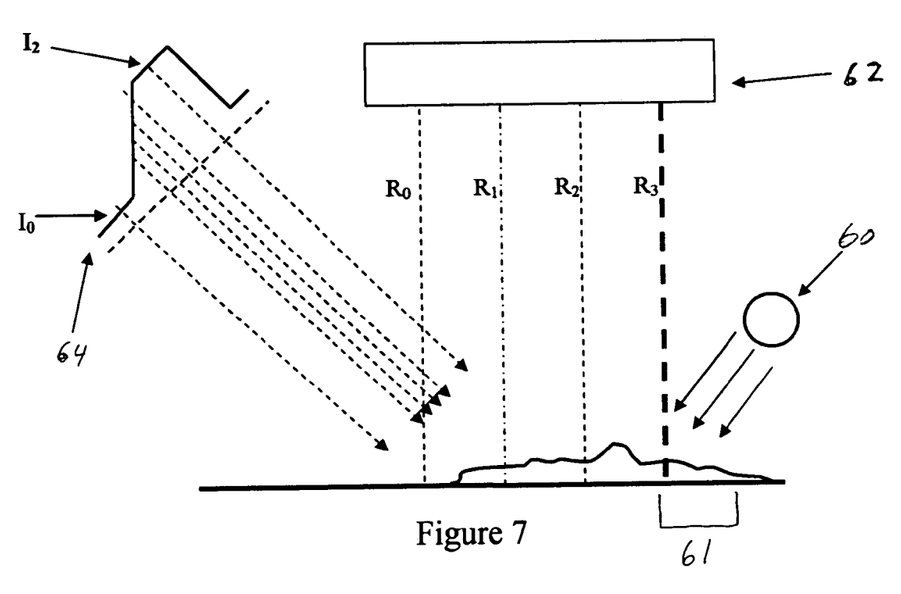
FIG. 7 is a diagrammatic illustration how simultaneous 2 dimensional and 3 dimensional images may be taken by my new measuring technique.

One main benefit of Applicant's approach is that use of a high-speed, random access, 2D imager such as the MT9M413 manufactured by Micron Technology™ as described above, allows imaging system 22 to be controlled, for example by a computer, so that the imaging system may be commanded to output full 2D images when required, and output 3D height information when a scanning operation takes place. For example, where printed circuit board assemblies are being inspected, it is required that 2D images are taken first to compute a precise location of the assembly or part being inspected, and then scan areas of interest to perform three-dimensional imaging and inspection. This flexibility of being able to switch from 2D to 3D at will is extremely useful as it allows the same system to be used for both 2D and 3D applications. Furthermore, Applicant's method allows 2D and 3D images to be acquired during a scanning operation. Since the imager of Applicant's invention facilitates random access readout of any part of the sensor, it is therefore a simple programming and control issue to read three rows of images needed for computation of height values while simultaneously reading read ing a 4 row (or number of rows) illuminated differently to produce 2D images. As seen in FIG. 7, a separate light source 60 projects light onto an area 61 that falls under R3. Imaging system 62 can be commanded to capture an image of a surface section corresponding to R3 simultaneously with acquisition of images related $R_0$, $R_1$ and $R_2$. To ensure that irradiation produced by light source 60 does not interfere with projected intensity pattern 64, one can use different wavelengths of light for light sources 64 and 60 in combination with light filtering techniques, mechanical shutters, or any other suitable means. Of course, intensity that is read at location $R_2$, or simply a value of r (average of $M_0$ and $M_2$) may be used to produce a 2D image. However, having flexibility to optimize capture of both 2D and 3D images is an important factor for most industrial applications, while additional complexity related to reading one more row of pixels is negligible.

Figure 8:
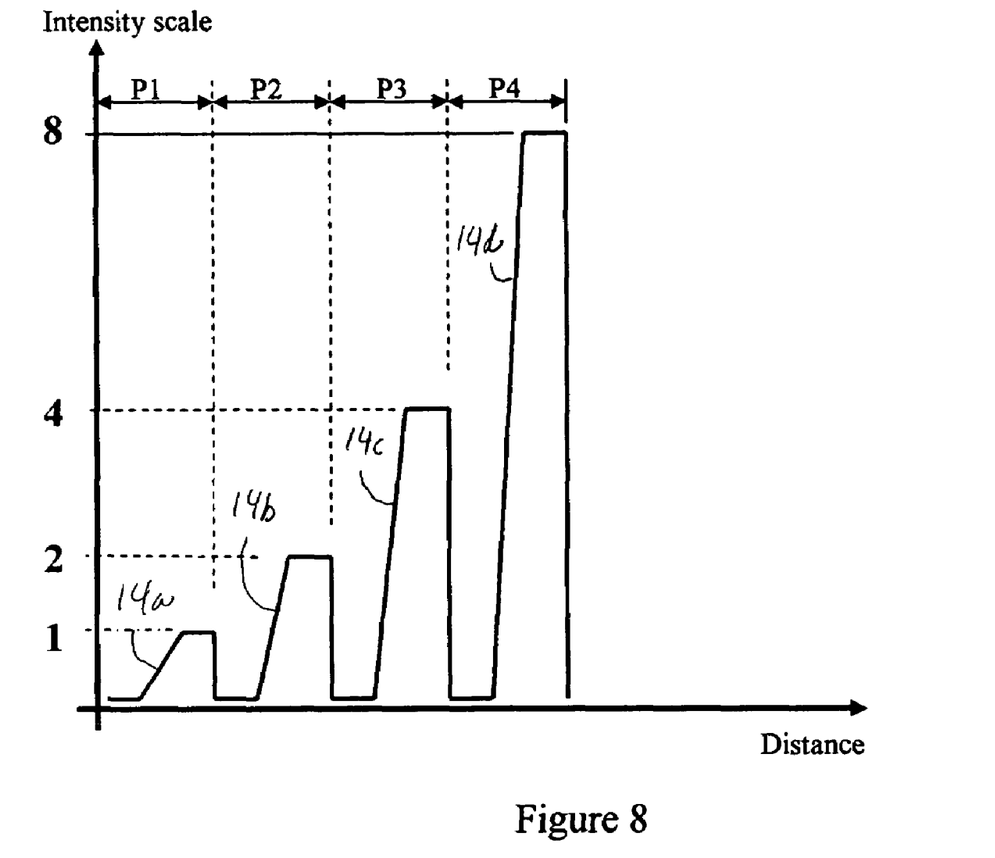
FIG. 8 is a graphic illustration showing how multiple light intensity patterns of my new measuring technique may be structured.

As mentioned earlier, capturing images of real-world applications is always a challenge because it is difficult, and at times impossible, to find an imaging illumination that is optimum (or even barely works) for all types of objects to be imaged. Industrial components, such as printed circuit boards, contain many different objects of different color, texture and reflectivity. Applicant's approach offers potential to optimize imaging condition for both 2D and 3D imaging without need for multiple scans. This is achieved through projection of multiple intensity patterns of different contrast, as shown in FIG. 8, and selecting data that provides best results. As can be seen in FIG. 8, projected intensity patterns 1, 2, 4 and 8 are modified so that contrast of each projected level of intensity is increased by the equivalent of one F-stop. Significantly, each pattern 1, 2, 4, 8 develops a gradient 14*a* 14*b*, 14*c*, and 14*d*, respectively. As such, contrast of each intensity pattern is twice that of a preceding intensity pattern with a gradient disposed between each pattern. A lowest light level between each pattern represents a darkest reference intensity level.

Figure 9:
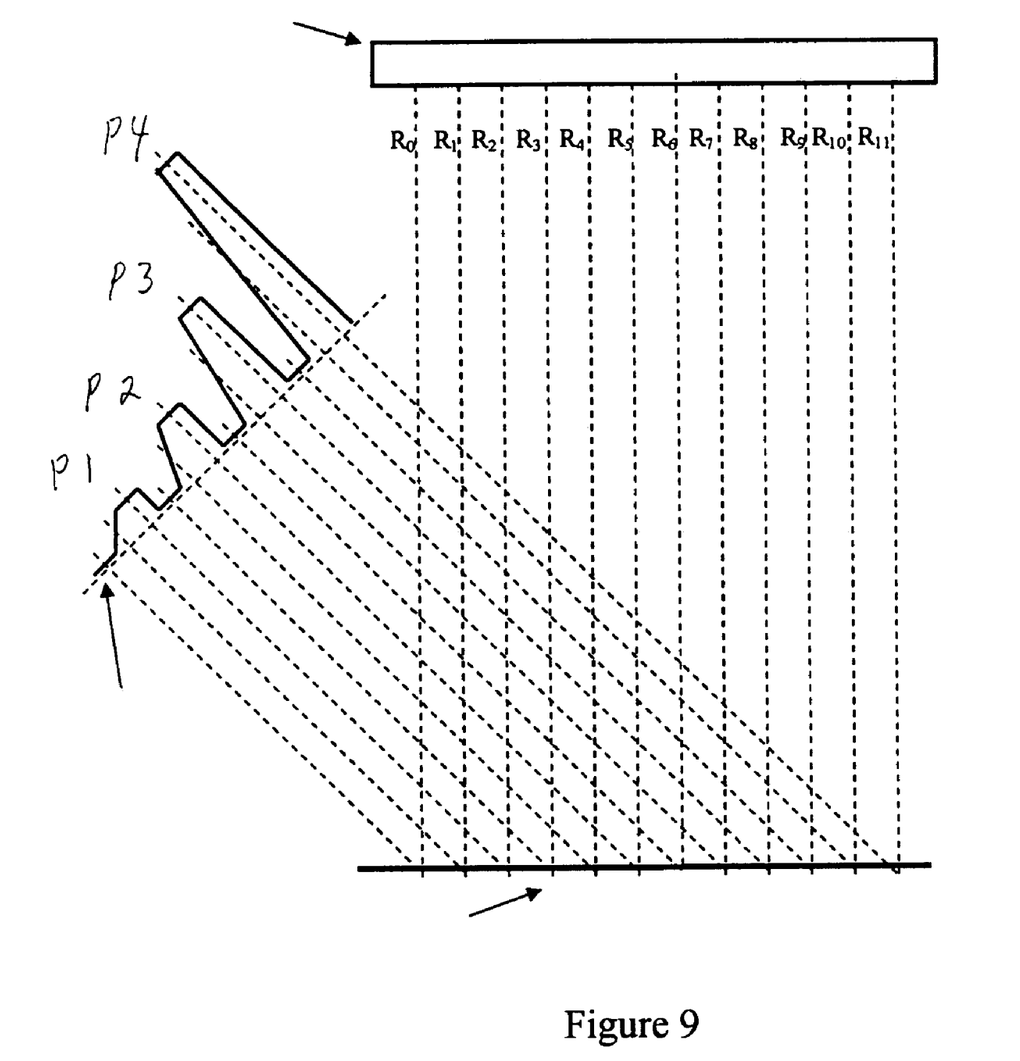
FIG. 9 is a diagrammatic illustration of how the light intensity patterns of FIG. 8 may be used in my new measuring technique.

Still referring to FIG. 8, regions designated P1 corresponds to a first, lowest intensity pattern 70. This pattern is arbitrarily assigned a contrast value of 1. The second pattern or region P2 is assigned a contrast value of 2, which is twice that of P1. This process of doubling a contrast value for each pattern is extended to regions P3 and P4. Note that while only 4 regions are shown to simplify presentation of FIG. 8, any practical number of regions may be selected depending on the application, with more regions allowing a wider range of reflectivities to be measured. Also, an increase in contrast from one region to another may be in increments other than doubling. When a composite pattern such as that shown in FIG. 8, instead of a gradient is used, an imaging arrangement as shown in FIG. 9 may be used. As can be seen, for each region P1, P2, P3, P4, there are three corresponding rows of images. For a first region P1 of the pattern, imaging rows that correspond to $R_0$, $R_1$ and $R_2$ are captured. Similarly, for a second region $P_2$, imaging rows that correspond to $R_3$, $R_4$, and $R_5$ are captured. For section P3, image rows corresponding to $R_6$, $R_7$ and $R_8$ are captured, and for region P4, image rows corresponding to $R_9$, $R_{10}$ and $R_{11}$ are captured. As scanning takes place, intensity values of pixels that correspond to all rows corresponding to locations $R_0$ thru $R_{11}$ are read and analyzed to select an optimum row. Here, the goal is to select data from a set of rows that is neither under-exposed nor over-exposed, but yet has a highest contrast. One possible algorithm for determining which set of rows to obtain data from involves calculating a score for each set of rows as follows:

$$\text{Score} = \text{Min } [(I_1 - I_0), (I_2 - I_1)] \quad [3]$$

The data from rows that have a highest score value is selected. This operation is performed for all pixels of all rows within each of regions P1, P2, P3 and P4, thereby resulting in optimum data analysis for each individual pixel. Furthermore, a user can associate a threshold with a score value to flag those measurements, if any, that may not have sufficient imaging contrast to result in reliable height information.

Figure 10:
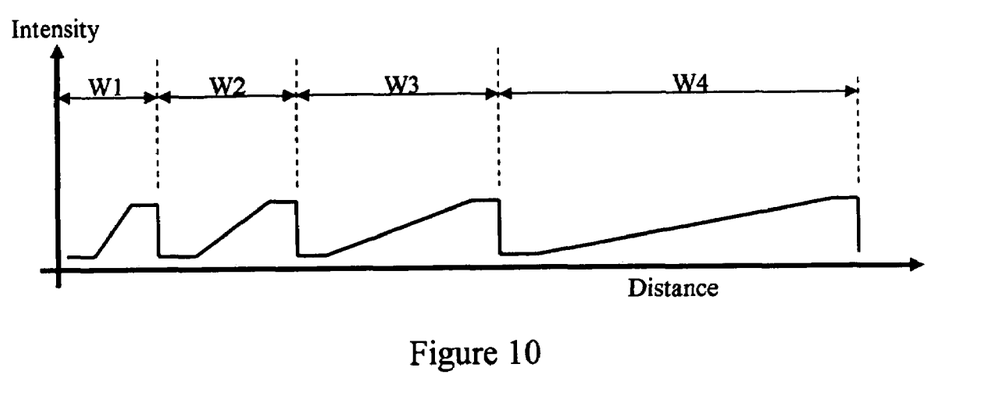
FIG. 10 is a graphic illustration of another light intensity pattern of my new measuring technique.

The concept of projecting an intensity pattern with multiple sections may be further extended to develop a measurement system having multiple measuring parameters, such as varying range and resolution. FIG. 10 shows an intensity pattern that has 4 intensity regions, each with a different and increasing wavelengths or gradients W1, W2, W3 and W4. A measuring range with respect to height for each gradient region is proportional to its wavelength. In other words, the wider the gradient, such as W4, the taller a measured object may be, although accuracy is somewhat reduced. Conversely, a narrower gradient, such as W1, the smaller an object must be but measurement accuracy is enhanced. Hence, the system may have 4 different measurement ranges. Obviously, the number of intensity regions W may be reduced or increased to meet different requirements.

Moreover, it is to be noted that all above-mentioned concepts, i.e. combined 3D and 2D imaging, extending dynamic range by use of multiple intensity regions and extending a measuring range by projecting multiple intensity regions may be combined together to produce a unique measuring system that offers all the above advantages in one system. Of course, these additions affect throughput of the system because more rows of the imaging sensor are required to be read. However, since the sensor of the instant invention has an extremely high bandwidth, processing time required to process a few more lines is relatively negligible. For this sensor, a measurement rate in terms of cross-sectional profile samples is given by the following equation:

$$\text{Rate of profile samples} = 1/(\text{Exposure period} + (N*L)) \quad [4]$$

Where N is the number of rows of the sensor selected for reading and L is the readout time for each row. For the MT9M413 sensor L is equal to 1.94 (approximately) microseconds. Hence:

$$\text{Rate of profile samples} = 1/(\text{Exposure period} + (N*1.94)) \quad [5]$$

For example, assuming an exposure period of 100 microseconds and that the measurement system requires a total of 13 rows to be read, one for generating a 2D scanned image and 12 rows for the four intensity sections (as was shown in FIG. 9), the rate will be:

$$\text{Rate of profile samples} = 1/(0.0001 + (13*0.00000194))$$
$$= 7985(\text{profiles/second})$$

Considering that the sensor of the instant invention has 1280 pixels along each row, an actual number of 3D measurement samples will be in excess of (7985*1280), or 12.22 million samples per second, which is extremely fast for this type of system.

Having thus described my system and the manner of its use, it should be apparent to those skilled in the relevant arts that incidental changes may be made thereto that fairly fall within the scope of the following appended claims, wherein I claim:

The invention claimed is:
1. A 3 dimensional scanning and measurement method comprising:
   A) angularly directing at least one linear light gradient onto a workpiece,
   B) causing relative movement between said workpiece and said light gradient in a direction perpendicular to said light gradient,

C) receiving an image of said light gradient and said workpiece on a light sensor having a plurality of rows of pixels oriented generally parallel with said light gradient as said light gradient moves across said work piece, D) reading electrical outputs from selected ones of said rows of pixels from said plurality of rows of pixels on said light sensor, E) computing elevation of features on said workpiece from selected said electrical outputs.

2. A method as set forth in claim 1 further comprising reading digital outputs from said selected ones of said rows of pixels.

3. A method as set forth in claim 2 further comprising angularly directing a plurality of linear light gradients onto said workpiece.

4. A method as set forth in claim 3 further comprising selecting three said rows of pixels for each linear light gradient of said plurality of linear light gradients, with a first said row of pixels registering light from a darkest portion of said linear light gradient, a second said row of pixels registering light from about a middle of said linear light gradient and a third said row of pixels registering light from about a brightest portion of said linear light gradient.

5. A method as set forth in claim 4 further comprising configuring each said linear light gradient so that each said linear light gradient passes a different maximum intensity of light.

6. A method as set forth in claim 5 further comprising configuring a first of said linear light gradients to pass a lowest said maximum intensity of light, with each successive said linear light gradients passing a doubled said maximum intensity of light.

7. A method as set forth in claim 5 further comprising reading said digital outputs from said three rows of pixels associated with a said linear light gradient having optimum illumination conditions for said computing elevation of features.

8. A method as set forth in claim 7 further comprising determining said optimum illumination conditions according to a highest score as derived by: Score=Min $[(I_1-I_0), (I_2-I_1)]$.

9. A method as set forth in claim 8 further comprising configuring a darkest portion of all of said plurality of linear light gradients with equal light intensity.

10. A method as set forth in claim 9 further comprising using said darkest portion of said linear light gradients as a reference level.

11. A method as set forth in claim 9 further comprising configuring said darkest portion of light as a minimum light intensity level registrable by said pixels and a said highest intensity of light passed by a last said linear light gradient just below a saturation level of said pixels.

12. A method as set forth in claim 1 further comprising reading at least one said row of pixels that is not read to determine said elevation of features to generate an image of said workpiece.

13. A method as set forth in claim 12 further comprising said reading electrical outputs from selected ones of said rows of pixels to compute said height of features and said reading at least one said row of pixels that is not read to compute said height of features to generate an image occur simultaneously in a single pass of a scanning operation.

14. A method as set forth in claim 4 further comprising configuring each of said plurality of linear light gradients so that each said linear light gradient has a different wavelength.

15. A method as set forth in claim 14 further comprising configuring each of said plurality of linear light gradients so that a first of said linear light gradients has a shortest said wavelength and a last of said linear light gradients has a longest said linear light gradient.

16. A method as set forth in claim 14 wherein a first of said linear light gradients is configured to have a shortest said wavelength and each successive said linear light gradient has a said wavelength that is doubled with respect to a preceding said linear light gradient.

17. A method as set forth in claim 16 further comprising selecting said three lines of pixels read for each said linear light gradient spaced apart a distance generally proportional to a wavelength of an associated said linear light gradient so that a said three lines of pixels associated with a said light gradient that is a smallest said linear light gradient is able to measure said elevation of features with greatest accuracy, and a said three lines of pixels associated with a largest said linear light gradient is able to measure said elevation of features with a greatest range.

* * * * *